April 19, 1960 J. M. DE STEFANO 2,933,706
STRAIN GAUGE MEASUREMENT DEVICE
Filed May 29, 1957
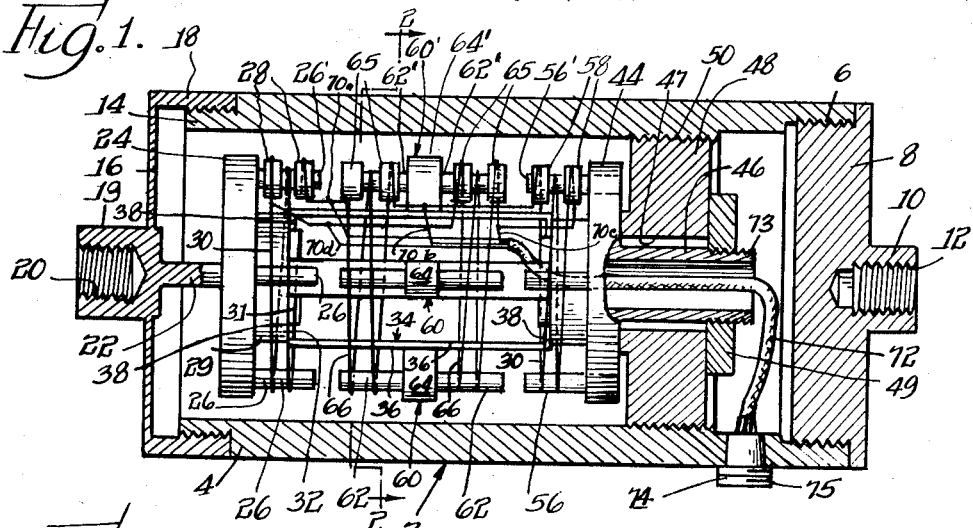
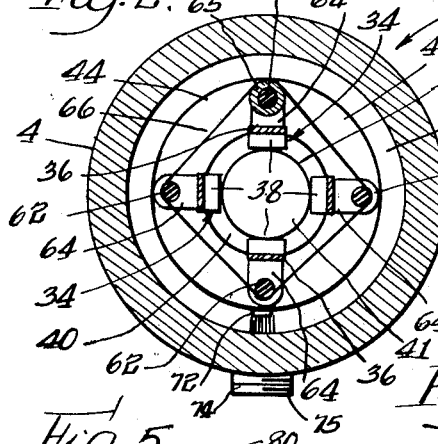
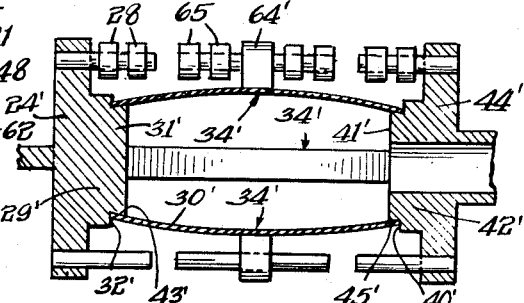
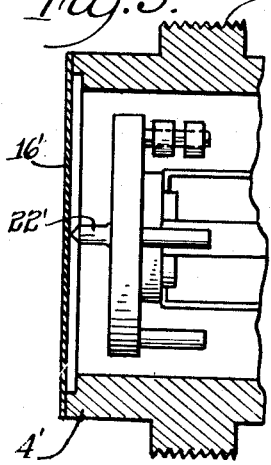
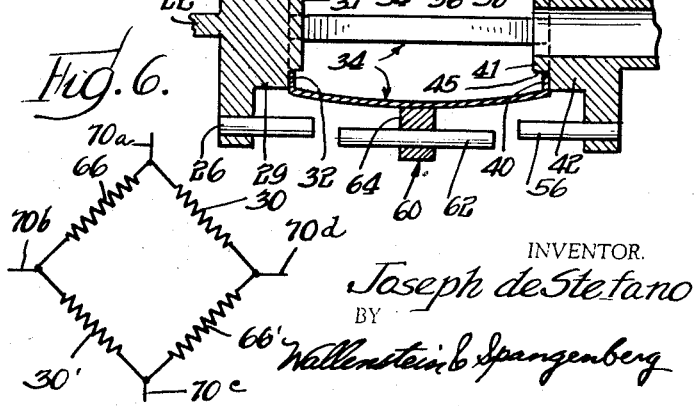
INVENTOR.
Joseph deStefano
BY
Wallenstein & Spangenberg

United States Patent Office 2,933,706
Patented Apr. 19, 1960

2,933,706

STRAIN GAUGE MEASUREMENT DEVICE

Joseph M. De Stefano, Nixon, N.J., assignor to Gulton Industries, Inc., Metuchen, N.J., a corporation of New Jersey Application May 29, 1957, Serial No. 662,507

6 Claims. (Cl. 338—4)

This invention relates to a device for measuring forces or displacement of moving objects and, in general, any parameter which can be expressed as a force, utilizing the variable resistance characteristics of strain gauge wire which varies in resistance with the stress applied thereto.

Numerous different types of strain gauge devices have been heretofore utilized. These types fall under the general classifications of the bonded and unbonded types. The bonded type usually consists of a number of elongated loops of wire bonded to a plate which in turn is anchored to the object to be placed under stress, so that upon expansion and contraction of the plate, the wire is also expanded and contracted to change the resistance thereof. The unbonded strain gauge devices fall into two general categories, one in which the strain gauge wire is looped around pins carried by two separate and relatively movable parts, one of which is moved by the force to be measured, and another where the wire is placed around different relatively movable points of a single member, which is arranged to be expanded and contracted under the force to be measured. Examples of the latter type of unbonded strain gauges include a device where the strain gauge wire is wound around an expansible cylinder, as shown in U.S. Patent 2,391,966 granted January 1, 1946 to V. S. Harrison; a device where the wire is wound around pins secured to different points of a deformable ring, as shown in U.S. Patent 2,600,701 granted June 17, 1952 to L. D. Statham et al.; and a device where the wire is wound around pins secured between the confronting inner ends of generally straight, radially and inwardly inclined spider arms connected to respective end members, which cause the outer ends of the spider arms to bend only at their junctures with the end members, resulting in outward radial movement of the inner ends of the spider arms when the end members are brought closer together, as in U.S. Patent 2,636,964 granted April 28, 1953, to J. H. Hancor, Jr. et al.

The present invention relates to a fourth and new type of unbonded strain gauge falling under the second category of unbonded strain gauge devices. In this new form of unbonded strain gauge, the bowing action of a column-like member caused by the application of eccentric axial forces is utilized to impart strain to the strain gauge wire. A number of these column-like members, to be sometimes referred to as flexure members, are arranged preferably in a circle and the strain gauge wire is preferably supported by the medial portions of the flexure members. These column-like or flexure members, are substantially straight in their unstressed state and are supported between axially-spaced support members which may or may not place the column-like or flexure members under initial compression, depending upon whether the force to be measured will alternate in direction from a no load condition or will merely operate in one direction. In the case where the flexure members are initially unstressed, the ends thereof are provided with outwardly or inwardly extending legs which contact the support members at points spaced inwardly or outwardly of the longitudinal axis thereof so as to be subjected to eccentric column loading which bows the flexure members outwardly or inwardly upon axial movement of one of the support members toward the other. Where the flexure members are to be placed under substantial initial pre-compression which bows them, the above-mentioned legs are unnecessary to subject the flexure members to eccentric column loading under application of the axial force to be measured to one of the support members. Wire support posts are preferably secured to the outside of the flexure members at medial points thereon where flexure thereof will be at a maximum, and the strain gauge wire is tautly wound around the support posts so that the resistance thereof varies appreciably upon any variation in the bowing of the flexure members.

The support members and the flexure members are preferably placed within a cylindrical casing and one of the support members is connected to the inside walls thereof so as to be axially adjustable therein. The other support member is connected to the flexible central portion of a diaphragm plate secured at its perimeter to the defining walls of an open end of the casing. The diaphragm is subjected to the force to be measured which moves the support member to which it is connected relative to the other support member so that the flexure members are bowed to a varying extent depending upon the degree of the force applied to the diaphragm plate.

Some of the advantages of the present invention over prior unbonded types of strain gauges include greater sensitivity, adjustability and adaptibility to different uses, and ruggedness.

Other advantages and features of the invention may become apparent upon making reference to the specification to follow, the claims and the drawings wherein:

Fig. 1 is a partial longitudinal sectional view of one form of a force gauge constructed in accordance with the present invention;

Fig. 2 is a transverse sectional view through the force gauge of Fig. 1, taken along section line 2—2;

Fig. 3 is a longitudinal sectional view of the form of the invention shown in Figs. 1 and 2, but showing the flexure members under stress;

Fig. 4 is a fragmentary longitudinal sectional view through another form of the invention wherein the flexure members are prestressed;

Fig. 5 is a view of the strain gauge of Fig. 1 or Fig. 4 provided with a modified diaphragm assembly which adapts the gauge for use in measuring fluid pressure; and Fig. 6 is a schematic diagram showing an exemplary bridge circuit formed by the strain gauge wires in Figs. 1 through 5.

Referring now to Figs. 1, 2 and 3, the force measuring device, there shown and generally indicated by the reference numeral 2, is a device for measuring force which operates in only one direction relative to a no load condition. The device includes an open-ended cylindrical casing member 4 forming a support frame for the various parts of the device. The casing member has an internally threaded open end 6 into which an end cap 8 is threaded. The end cap 8 is provided with a connecting boss 10 having a central threaded opening 12 for threading the force gauge onto a suitable stationary anchoring structure.

The other end of the cylindrical casing 4 has a reduced externally threaded neck 14 around which is threaded a circular diaphragm end plate 16. The diaphragm end plate 16 has an internally threaded collar portion 18 which is threaded over the threaded neck 14 of the casing member 4. At the center of the diaphragm plate is an outwardly extending cylindrical boss 19 having a centrally located threaded bore 20 which may be threaded over a projection extending from the force applying structure, not shown, which imparts axial movement to the central regions of the diaphragm plate 16. A centrally located connecting arm 22 projects axially inwardly of the diaphragm 16, the inner end of the connecting arm 22 being secured to a support member 24. The support member 24 carries at least two, preferably four, equally circumferentially spaced, axially extending insulating posts, such as 26, which are spaced along a circle which is coaxial of the axis of the casing part 4 and the diaphragm plate 16. At least one of these insulating posts 26' has two or more spaced metal sleeves 28—28 secured thereto. A winding 30 of strain gauge resistance wire forming a leg of a resistance bridge is mounted around the pins 26 and 26' by first soldering a spot welding one end of the wire section 30 to one of the sleeves 28 on pin 26' and tautly winding the same around the other pins 26 and bringing the next loop around the portion of pin 26' between the sleeves 28—28. After completing this second loop around the pins 26, the end of the wire forming it is soldered or spot welded to the other sleeve 28. By increasing the number of sleeves 28, the number of serially connected loops of strain gauge wire around the pins 26 and 26' can be increased to a point limited, of course, by the length of the pins and the widths of the sleeves.

The support member 24 has a central inwardly projecting cylindrical portion 29 having a reduced inner end 31 providing an annular shoulder 32 upon which bears four equally circumferentially spaced flexure members 34. These flexure members may be made of a resilient metal such as steel or the like and are made in the form of thin bars. Each has, in an unstressed state, a straight body portion 36 and inwardly extending legs 38—38 at the opposite ends thereof. One of the legs 38 of each flexure member is secured in any suitable way in face-to-face contact with the annular shoulder 32 of the support member 24. The leg 38 at the other end of each flexure member is secured in a similar way to an annular shoulder 40 formed by the reduced inner end 41 of a central cylindrical portion 42 of a support member 44. Eccentric loading of the flexure members is obtained by terminating the annular shoulders 32 and 40 on the inner sides of the main longitudinal axes of the flexure members, as shown most clearly in Fig. 3. The ends of the legs are also in contact with the cylindrical peripheral surfaces 43 and 45 (Fig. 3) of the reduced ends of the associated support members. The legs 38—38 are preferably permanently secured to the annular shoulders 32 and 40 by welding or soldering the same thereto.

The support member 44 has an axially and outwardly extending hollow cylindrical neck 46 freely passing through a central opening 47 in an adjuster member 48 which is threaded into an internally threaded portion 50 of the casing part 4. The support member 44 is held in place against the inner face of the adjuster member 48 by a nut 49 threaded around the neck 46 and bearing against the outer face of the adjuster member. The axial position of the adjuster member 48 is preferably initially adjusted so that the flexure members 34 are under little or no compression so that they are substantially straight as shown in Fig. 1.

The support member 44 carries a number of inwardly axially extending insulating posts 56, one of which 56' has two or more metal sleeves 58—58 secured thereto. A winding 30' of strain gauge resistance wire is tautly wound around the insulating posts 56 and 56', and is soldered or spot welded at its ends to the sleeves 58—58 in the same manner as winding 30 is wound around the posts 26 and 26' and secured to the sleeves 28—28.

Secured to the outside of the medial portion of each flexure member is a support post assembly 60 including an insulator post 62 extending axially from both sides of a central support arm 64 secured as by soldering or spot welding to the associated flexure member. Secured to the insulator post 62' of only one of the insulator post assemblies 60' on each side of the associated support arm 64' are metal sleeves 65—65. Strain gauge resistance wires are tautly looped under tension around the outside of the posts 62, 62' on each side of the central support arms 64, 64' and secured at their ends to the metal sleeves 65, 65' to form respective force-measuring windings 66—66' in the same manner as the windings 30 and 30' are formed.

The windings 66—66' and 30—30' are connected to form a Wheatstone bridge circuit as shown in Fig. 6, with the windings 66 and 66' forming two of the opposite arms of the bridge and the windings 30 and 30' forming the two other opposite arms of the bridge. The various bridge-forming connections between these windings are made within the casing part 4 and terminal leads 70a, 70b, 70c and 70d extend from these connections within a common cable 72 which passes through an axial central bore 73 of the support member 44. The leads are, of course, insulated from one another within the cable 72. The leads terminate at and are electrically connected to terminals of a socket fitting 74 mounted within a recess in the walls of the casing 4. The fitting projects beyond the casing 4 and this projecting portion is externally threaded at 75 to receive a connector, not shown, with terminal prongs which fit within the terminal sockets of the fitting 74.

When an inwardly directed force is applied to the center of the diaphragm plate 16, the left hand support member 24 connected thereto is moved to the right thereby compressing the flexure members between the support members 24 and 44. With the application of this column loading to the legs 38 of the flexure members, eccentric loading results which bows the flexure members outwardly, because the force is applied to the end of the initially straight portion 36 of each member on only the inner side of the main longitudinal axis thereof. The resultant outward bowing of the windings 66 and 66' unbalances the bridge circuit which, it is assumed, was previously balanced. Fig. 3 shows, in an exaggerated manner the bowing of the flexure members under load conditions.

Where it is desired to measure a force or movement alternating in opposite directions from a no load condition, the flexure members 34 may be prestressed to a substantial degree by rotating the adjuster member 48 to bring the support members 24 and 44 closer together so that the flexure members will be bowed under the entire expected range of the force to be measured. Refer now to the modified form of the invention shown in Fig. 4 which is especially constructed to measure such a force. The support member 24' and 44' and the flexure members 34' therein are modified in construction over the corresponding elements in the embodiment of Figs. 1 and 2. The other parts thereof may be identical to those of Figs. 1–3. The modified support members have central cylindrical portions 29' and 42' which respectively have reduced inner ends 31' and 41' having reversely tapering peripheral surfaces 43' and 45' adjoining short inwardly axially facing annular shoulders 32' and 40' against which the ends of the flexure members 34' bear. The flexure members 34' do not have the legs 38—38 as in the embodiment of Figs. 1–3. They are preferably welded in place upon the reversely tapering surfaces 43' and 45' of the support members 24' and 44'. The flexure members are initially bowed and kept in such bowed condition by placing them under initial compression by proper spacing of the support members 24' and 44'. Fig. 4 shows in an exaggerated manner the initial shape of the flexure members under no load conditions. Because of the initial bowed condition of the flexure members, any force other than one which completely cancels the initial compression of the flexure members will keep them under eccentric loading, and for this reason, legs are not needed to ensure eccentric loading upon application of an alternating load, the bowed condition of the flexure members will vary between lesser and greater outwardly bowed condition from that represented by the initial bowed condition shown in Fig. 4. This will cause a corresponding variation of the strain in the resistance wires making up the windings 66 and 66'.

Where gas or liquid fluid pressures are to be measured, the diaphragm plate 16 and the casing member 4 of the embodiments previously described are preferably replaced by the diaphragm plate 16' and the casing member 4' shown in Fig. 5. The casing member has an externally threaded cylindrical flange 80 which may be threaded into the internally threaded end of a conduit containing the fluid whose pressure is to be measured. Instead of a threaded flange, the casing member flange could have a smooth surface which fits into an adapter or housing or the flange could be designed for connection to a similar flange formed on the end of the conduit. The periphery of the diaphragm plate 16' is secured in any suitable way, as by soldering, welding, brazing or the like, to the open end of the casing member where it closes off the end thereof. The center of the diaphragm plate 16' contacts the end of an arm 22' which extends from the support member like 24 or 24' above described. When the outer side of the diaphragm plate 16' is subjected to a positive pressure, the center of the plate will deflect inwardly, thereby forcing the arm 22' and the attached support member in the same direction, causing outward bowing of the flexure members and a change in the resistance of the windings 66 and 66'.

The force or pressure gauges of the invention above described are highly linear and sensitive in response, are flexible in their use and are extremely rugged.

It should be understood that numerous modifications may be made of the most preferred forms of the invention above described, without deviating from the broader aspects of the invention. For example, a mass could be substituted in place of the diaphragm 16' in Fig. 5 to form an accelerometer.

I claim as my invention:

1. A force measuring unit comprising a pair of axially spaced, transversely extending, relatively axially movable, rigid end support members, at least three circumferentially spaced flexure members each of which has a main body portion extending axially between said end support members, the main body portions of said flexure members being slender and flexible for their entire lengths, the main body portions of said flexure members also being substantially straight between their ends in their unstressed state wherein all portions thereof extend substantially at right angles to said end support members, the ends of said main body portions of said flexure members contacting said end support members at points located on axial lines passing through the entire lengths of the main body portions of said flexure members in their unstressed state, relative inward axial movement of said end support members flexing each of said flexure members into a continuous arc terminating at the ends of the main body portion of the flexure member adjacent said end support members, windings of strain-sensitive resistance wire tautly supported from the medial portions of said flexure members so that any lateral bowing of the flexure members will vary the tension and hence the resistance of said wire, and connecting wire means extending from said windings of wire to connect the same to an external measuring circuit.

2. The force measuring unit of claim 1 wherein each of said flexure members is a strip of resilient sheet metal of rectangular cross section with the thin dimension thereof extending generally radially, wherein said flexure members will bow radially in response to relative inward movement of said end support members.

3. The force measuring unit of claim 1 wherein said flexure members each has an axially extending insulating wire support post connected to the outer side of the central portion thereof where the flexure is near a maximum, the end of each support post extending axially outwardly an appreciable extent from their points of conection to said flexure members, said windings of srtain-sensitive resistance wire being wound around each of said wire support posts at points outwardly of the points of connection of said support posts to said flexure members.

4. The force measuring unit of claim 1 wherein said end support members have reduced inner ends providing inwardly axially facing surfaces and outwardly radially facing surfaces, the outer end surfaces of said flexure members abutting said axially facing surfaces of said end support members and the inside portions of the ends of said flexure members contacting said outwardly radially facing surfaces of said end support members.

5. The force measuring unit of claim 1 wherein said flexure members have end legs extending transversely from the ends of said main body portions, the ends of said flexure members including said legs being in face-to-face contact with said end support members up to points opposite the main body portions of the flexure members, contact between said end support members and the main body portions of said flexure members terminating at points eccentrically located with respect to the center lines of the main body portions of the flexure members on the side thereof nearest said legs.

6. A force measuring unit comprising a pair of axially spaced, relatively axially movable end support members, at least three circumferentially spaced flexure members extending axially between said end support members, said flexure members being mounted for eccentric column loading upon relative inward axial movement of said end support members, which loading bows the flexure members outwardly, respective axially extending insulating wire support post means connected to the outer side of the central portions of said flexure members where the flexure thereof will be near a maxmium, the ends of said axially extending support post means extending axially outwardly from their points of connection to said flexure members, axially spaced windings of strain-sensitive resistance wire tautly looped around said support post means at points outwardly of said points of connection of said support post means, whereby a change in the flexure of said flexure members will result in the variation of the resistance thereof by expanding or contracting the wire loops, and connecting wire means extending from said loops of wire to connect the same to an external measuring circuit.

References Cited in the file of this patent
UNITED STATES PATENTS

| | | |
|---|---|---|
| 2,634,721 | Greenwood | Apr. 14, 1953 |
| 2,636,964 | Lancor et al. | Apr. 28, 1953 |
| 2,698,371 | Li | Dec. 28, 1954 |
| 2,727,387 | Cherniak | Dec. 20, 1955 |
| 2,729,730 | Brady | Jan. 3, 1956 |